United States Patent
Geurts

(10) Patent No.: US 12,427,915 B2
(45) Date of Patent: Sep. 30, 2025

(54) VEHICLE ROOF ASSEMBLY COMPRISING A PATTERNED TRANSPARENT PANEL AND METHOD OF PROVIDING A PATTERN ON A TRANSPARENT ELEMENT

(71) Applicant: INALFA ROOF SYSTEMS GROUP B.V., Oostrum (NL)

(72) Inventor: Stephan Paulus Jan Geurts, Belfeld (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 18/414,881

(22) Filed: Jan. 17, 2024

(65) Prior Publication Data

US 2024/0246482 A1    Jul. 25, 2024

(30) Foreign Application Priority Data

Jan. 20, 2023 (EP) .................................... 23152661

(51) Int. Cl.
  *B60Q 3/208* (2017.01)
  *B60J 7/043* (2006.01)
  (Continued)

(52) U.S. Cl.
  CPC .............. *B60Q 3/208* (2017.02); *B60J 7/043* (2013.01); *B60Q 3/62* (2017.02); *F21S 41/40* (2018.01); *G02B 6/0033* (2013.01); *G02B 6/0035* (2013.01); *G02B 6/0036* (2013.01); *G02B 6/0038* (2013.01); *G02B 6/004* (2013.01);
  (Continued)

(58) Field of Classification Search
  CPC .. G02B 6/0033; G02B 6/0035; G02B 6/0036; G02B 6/0038; G02B 6/004; G02B 6/0041; G02B 6/0043; G02B 6/0061; G02B 6/0095; B60Q 3/208
  See application file for complete search history.

(56) References Cited

U.S. PATENT DOCUMENTS

| 9,006,751 B2 | 4/2015 | Kleo et al. |
| 10,025,027 B2 | 7/2018 | Odulinski et al. |

(Continued)

FOREIGN PATENT DOCUMENTS

| DE | 10226451 C1 | 7/2003 |
| DE | 102011016433 A1 | 10/2012 |

(Continued)

OTHER PUBLICATIONS

European Search Report in corresponding European patent application No. 23152661.7 dated Jul. 17, 2023.

*Primary Examiner* — Colin J Cattanach
(74) *Attorney, Agent, or Firm* — Westman, Champlin & Kochler, P.A.; Steven M. Koehler

(57) ABSTRACT

A roof assembly for covering an opening in a vehicle roof comprises a transparent panel and a lighting assembly. The lighting assembly comprises an illumination pattern arranged on the transparent panel. The illumination pattern comprises at least one low-density pattern element. Such low-density pattern element comprises a light-scattering area and transparent areas. The transparent areas are enclosed within the light-scattering area. A surface area of the light-scattering area of the low-density pattern element is smaller than a sum of a surface area of the enclosed transparent areas.

10 Claims, 2 Drawing Sheets

(51) Int. Cl.
  *B60Q 3/62* (2017.01)
  *F21S 41/40* (2018.01)
  *F21V 8/00* (2006.01)

(52) U.S. Cl.
  CPC .......... *G02B 6/0041* (2013.01); *G02B 6/0043* (2013.01); *G02B 6/0061* (2013.01); *G02B 6/0095* (2013.01)

(56) References Cited

U.S. PATENT DOCUMENTS

| | | | |
|---|---|---|---|
| 10,300,849 | B2 | 5/2019 | Barillot et al. |
| 11,285,790 | B2 | 3/2022 | van Doleweerd et al. |
| 2012/0134173 | A1 | 5/2012 | Mueller |
| 2012/0195065 | A1 | 8/2012 | Hyakuta et al. |
| 2012/0287665 | A1 | 11/2012 | Hyakuta et al. |
| 2014/0043850 | A1 | 2/2014 | Thompson et al. |
| 2015/0003106 | A1 | 1/2015 | Thompson et al. |
| 2015/0298601 | A1 | 10/2015 | Bott et al. |
| 2016/0041331 | A1 | 2/2016 | Odulinski et al. |
| 2017/0336555 | A1 | 11/2017 | Yanai et al. |
| 2018/0086260 | A1 | 3/2018 | Barillot et al. |
| 2018/0201189 | A1 | 7/2018 | Kim |
| 2020/0041846 | A1 | 2/2020 | Mizuguchi |
| 2020/0276891 | A1* | 9/2020 | van Doleweerd ............ B32B 17/10036 |
| 2022/0018516 | A1 | 1/2022 | Mannheim Astete et al. |
| 2022/0381418 | A1 | 12/2022 | Mannheim Astete et al. |

FOREIGN PATENT DOCUMENTS

| | | |
|---|---|---|
| DE | 102016005679 A1 | 11/2017 |
| DE | 102018208740 A1 | 12/2019 |
| EP | 3300940 A1 | 4/2018 |
| EP | 3702217 A1 | 9/2020 |
| FR | 3043025 A1 | 5/2017 |
| WO | 2007077099 A1 | 7/2007 |
| WO | 2014140502 A1 | 9/2014 |
| WO | 2014167291 A1 | 10/2014 |
| WO | 2020201973 A1 | 10/2020 |
| WO | 2023025895 A1 | 3/2023 |

* cited by examiner

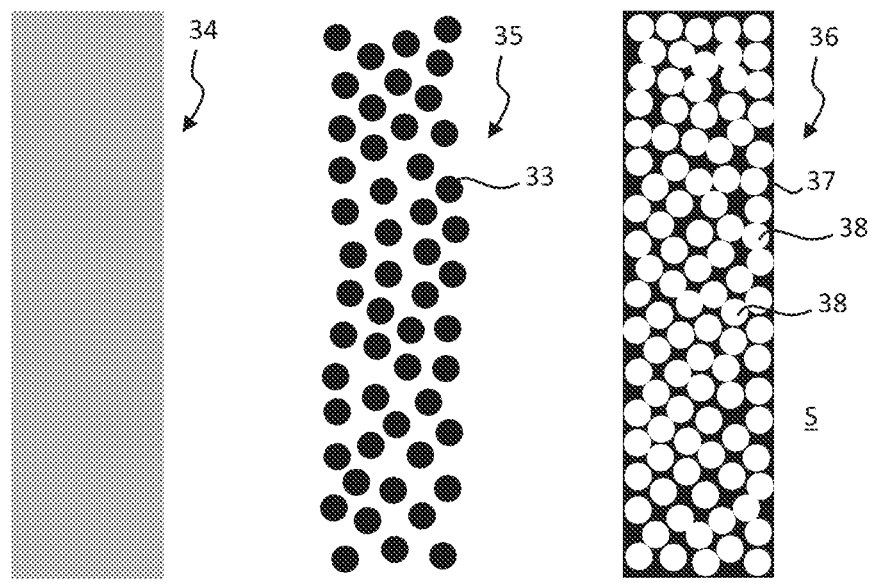
Fig. 3A  Fig. 3B  Fig. 3C
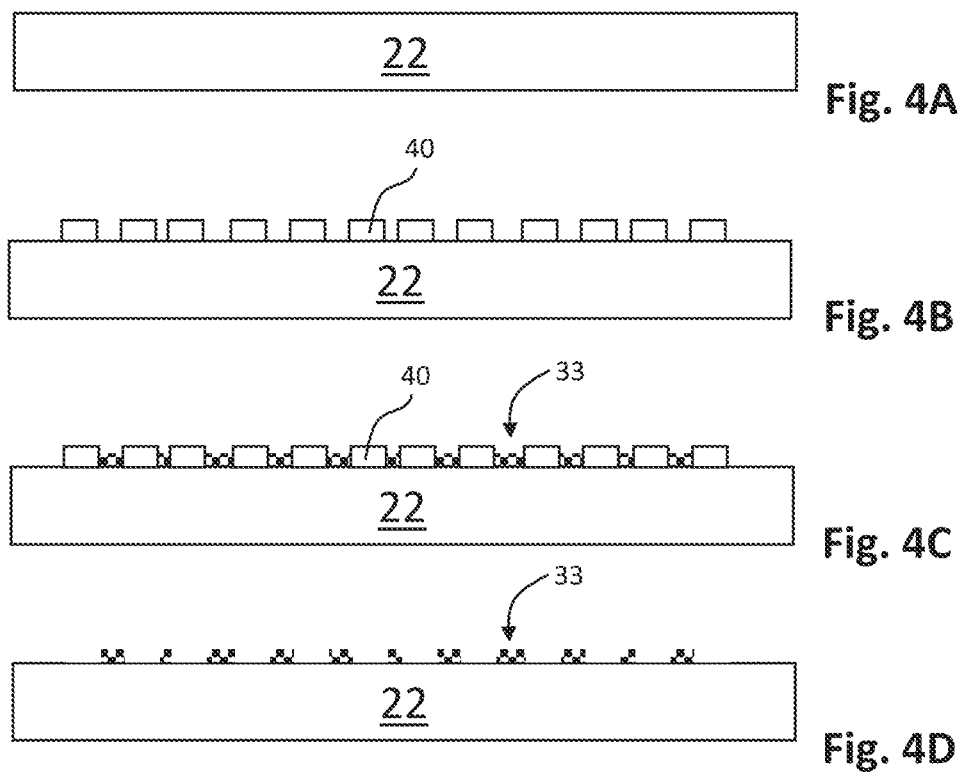
Fig. 4A
Fig. 4B
Fig. 4C
Fig. 4D

VEHICLE ROOF ASSEMBLY COMPRISING A PATTERNED TRANSPARENT PANEL AND METHOD OF PROVIDING A PATTERN ON A TRANSPARENT ELEMENT

CROSS-REFERENCE TO RELATED APPLICATION

This application claims priority to European patent application no. 23152661.7, filed Jan. 20, 2023, which is incorporated herein by reference in its entirety.

BACKGROUND

The discussion below is merely provided for general background information and is not intended to be used as an aid in determining the scope of the claimed subject matter.

Aspects of the invention relate to a roof assembly for covering an opening in a vehicle roof, the roof assembly comprising a lighting assembly, wherein the lighting assembly comprises a pattern on a transparent panel. Further, aspects of the invention relate to a corresponding method of providing a pattern on a transparent element.

A vehicle roof assembly for a vehicle roof is well-known. For example, an open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastic. The closure member may be configured to tilt or to slide. Another example is a fixed, usually transparent panel in the vehicle roof of a passenger compartment to enable a sky view through the roof of the vehicle, for example, for any occupants in the passenger compartment.

In either of the above-mentioned vehicle roof assemblies or any other kind of vehicle roof assembly, a lighting assembly may be provided. Such a lighting assembly may comprise light emitting diodes, commonly known as LED's, or another suitable light source. The light source may illuminate an interior compartment of the vehicle indirectly. For example, light from the light source may be coupled into a transparent pane and coupled out of the pane by a suitable structure of a surface of the pane or by suitable elements arranged on the surface of the pane. Such a pane may be a part of a laminated stack of layers, including one or more panes and other layers, as known in the art.

Preferably, when the lighting assembly is switched off, the structuring of the surface or the elements on the surface are not noticeable for the occupants of the vehicle, when looking outward during daytime. Thereto, it is known to provide a semi-transparent pattern of only small pattern parts, for example. In particular, the pattern parts may be comprised of very small dots. As described e.g. in EP3702217A1, wherein dots have a dot surface area with a representative diameter of 80 microns or less. Or, in a particular example, the representative diameter may be larger than 80 microns and in such examples, the dots may be individually distinguishable, depending on the normal viewing distance which varies between vehicle types. Still, if the representative diameter of the dots remains smaller than about 150 microns, the dots remain invisible when the viewer focuses on the exterior viewings. Or in other examples, the representative diameter of the dots is within a range from about 50 microns to about 70 microns. Such dots are easily and cost-effectively manufacturable by screen printing. In another example, the representative diameter is within a range from about 20 microns to about 50 microns. Dots with a size in this range may be provided by inkjet printing, for example. Due to their very small size, such dots are even more difficult to detect with the human eye. However, for each of these examples, if a pattern part has a low density, which is formed by providing a number of very small dots, wherein a surface area covered by the dots is less than half of a surface area of the pattern part, an edge of such a pattern part may appear frayed or jagged when the lighting assembly is switched on.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An object of the present invention includes providing a pattern comprising a low-density pattern part, of which the edge does not appear frayed or jagged.

In a first aspect, a vehicle roof assembly comprises a transparent panel and a lighting assembly. The lighting assembly comprises an illumination pattern arranged on the transparent panel. The illumination pattern comprises at least one low-density pattern element. The low-density pattern element comprises a light-scattering area and multiple transparent areas enclosed within the light-scattering area. A surface area of the light-scattering area of the low-density pattern element is smaller than a sum of a surface area of each of the enclosed transparent areas.

Instead of forming the low-density pattern element by arranging a number of light-scattering dots within an area of the low-density pattern element, the area of the low-density pattern element is light-scattering with the exception of the transparent areas within the area of the low-density pattern element. As a result, an edge of the low-density pattern element is formed as a continuous edge of the light-scattering area, while a ratio of the surface area of the light-scattering area and the sum of the surface area of the transparent areas remains.

In an embodiment of the roof assembly, an edge of the low-density pattern element is formed between the light-scattering area and a surrounding area, the surrounding area being adjacent to the low-density pattern element. Hence, a circumferential edge of the low-density element is formed by the light-scattering area in contrast to the prior art where a formation of dots should merely give an impression of an edge of the low-density element.

In an embodiment of the roof assembly, the light-scattering area comprises a light-scattering composition. For example, a paint or an ink may be used as a light-scattering composition, applied on the transparent panel such to form the light-scattering area. In particular, the light-scattering composition may comprise a transparent carrier composition, in which a minor amount of light scattering particles may be arranged, for example as described in co-pending European patent application with application number EP21193114 (not yet published).

In an embodiment of the roof assembly, the light-scattering area of the transparent element comprises a surface texture different than the transparent area. By changing a surface texture of the transparent panel, light may be scattered as well.

In an embodiment, the multiple transparent areas enclosed within the light-scattering area have a surface area with a representative diameter of 150 microns or less, or preferably 120 microns or less, or even 80 microns or less. In other embodiments, the representative diameter of the multiple transparent areas is within a range from about 50 microns to about 70 microns. In another example, the representative diameter is within a range from about 20 microns to about 50 microns.

In an embodiment of the roof assembly, the transparent panel comprises a glass pane, the glass pane comprising a first main surface and a second main surface opposite the first main surface and four edge surfaces extending between the first main surface and the second main surface, wherein a light source is arranged adjacent to one of the edge surfaces for injecting light into the glass pane in a direction substantially parallel to the first and the second main surface and wherein the illumination pattern is provided on one of the first and the second main surface for scattering the injected light through one of the first and the second main surface.

In an embodiment of the roof assembly, the roof assembly is an open-roof assembly, the transparent panel being moveably arranged as a closure member of the open-roof assembly for covering or at least partly uncovering the opening in the vehicle roof.

In an aspect, a vehicle is provided, wherein the vehicle comprises the roof assembly according to one of the above-described embodiments of the roof assembly.

In an aspect, a method of providing an illumination pattern on a transparent element is provided. The method comprises designing the illumination pattern. The illumination pattern comprises at least one low-density pattern element, wherein the low-density pattern element comprises a light-scattering area and transparent areas enclosed within the light-scattering area. The method further comprises designing an inverse pattern, wherein the inverse pattern is complementary to the illumination pattern. The inverse pattern comprises inverse pattern elements corresponding to the transparent areas enclosed in the light-scattering area of the low-density pattern element. The method further comprises providing the inverse pattern on a surface of the transparent element, providing the illumination pattern on the transparent element and removing the inverse pattern from the transparent element such that an area that was covered by the inverse pattern is transparent.

In an embodiment of the method, the transparent element is a transparent panel. The transparent panel may be any transparent planar element used for providing the roof assembly. For example, in a particular embodiment, the transparent element may be a transparent foil, the transparent foil being configured to be applied on a rigid transparent panel.

In an embodiment, the inverse pattern is formed by a meltable composition and the method further comprises heating the meltable composition to melt the meltable composition for removing the inverse pattern.

In an embodiment of the method, the method further comprises performing an operation on the surface of the transparent element using the inverse pattern as a mask. For example, in a particular embodiment, the operation comprises applying a light-scattering composition, which may then be cured. In another exemplary embodiment, the operation comprises altering a surface texture of the transparent element. Thus, a surface texture of the transparent element may be changed to provide a light-scattering area.

BRIEF DESCRIPTION OF THE DRAWINGS

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings, in which:

FIGS. 3A-3C each show a part of a line element having a mean grey level of about 30%; and FIGS. 4A-4D illustrate method steps of a method for providing an illumination pattern on a transparent element.

DETAILED DESCRIPTION

Figure 1:
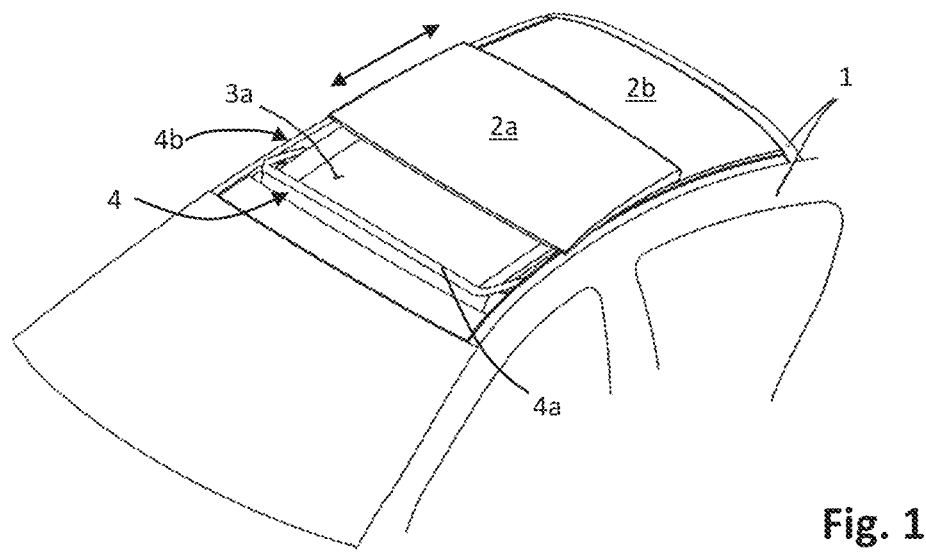
FIG. 1 shows a perspective view of a vehicle roof with an open roof assembly.

The present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Further, the present invention is not limited to an embodiment comprising a moveably arranged closure member. In another embodiment, the roof assembly may comprise a fixed transparent panel arranged over the first roof opening 3a, similar to the fixed panel 2b being arranged over the second roof opening 3b. In such embodiment, instead of two separate panels 2a, 2b, a single panel may be employed, as well known in the art.

Figure 2:
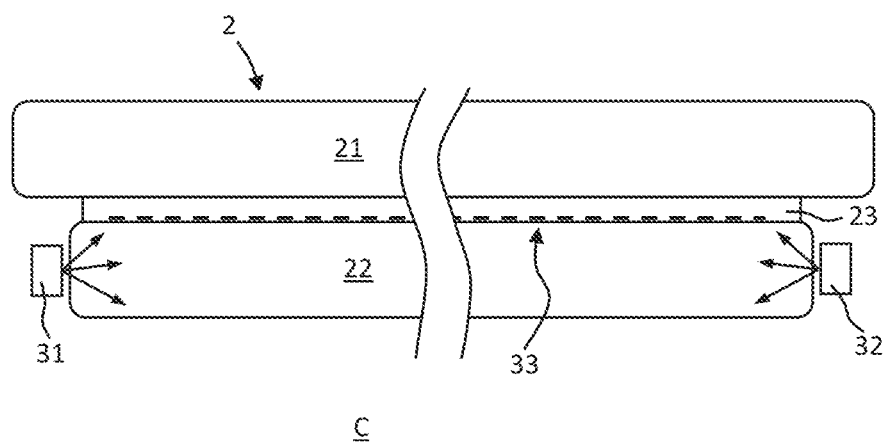
FIG. 2 shows a cross-section of an embodiment of a multi-layered transparent panel for use in a vehicle roof assembly.

FIG. 2 shows an embodiment of the above-mentioned vehicle roof assembly, in which a transparent panel 2 maybe employed. For example, the closure member 2a, the fixed panel 2b or both may comprise such a transparent panel 2.

In the illustrated embodiment, the transparent panel 2 comprises an exterior pane 21 and an interior pane 22. Each pane 21, 22 comprises a first and a second main surface and four circumferential edge surfaces. The exterior and interior panes 21, 22 are adhered to each other at one of their respective first and second main surfaces by a polymer layer 23, which may be a PVB layer or an EVA layer, for example, as well known in the art. The exterior pane 21 and the interior pane 22 maybe formed of any suitable transparent material including but not limited to glass or plastics. The material composition of the exterior pane 21 and the interior pane 22 maybe identical or may be different.

The transparent panel 2 comprises a lighting assembly. The lighting assembly comprises a first LED strip 31 and a second LED strip 32. Each of the LED strips 31, 32 are arranged and configured to emit light into the interior pane 22 at a circumferential edge surface thereof. The light is guided through the interior pane 22 acting as a light guide. A pattern of scattering structures 33 is provided at a boundary between one of the main surfaces of the interior pane 22 and the polymer layer 23. When the light propagating through the interior pane 22 impinges on one of the scattering structures 33, the light is scattered and as a result at least a part of the scattered light will leave the interior pane 22 in a direction of an interior compartment C, thereby illuminating the interior compartment C.

For providing an illumination pattern, a number of pattern elements may be formed by arranging a number of scattering structures 33. On the other hand, a surface area covered by the light scattering structures 33 is preferred to be relatively low such that light passing through the transparent panel 2 is not visually disturbed, e.g. during daytime, such that an occupant in the interior compartment C of the vehicle experiences an undisturbed view to the surroundings. Therefore, a pattern element may be formed with a low density, i.e. a surface area of the light-scattering structures of such a low-density pattern element is smaller than half of a surface area of the pattern element as a whole. In other words, a surface area of the light-scattering structures of such a low-density pattern element is smaller than a sum of a surface area of the transparent areas. FIGS. 3A-3C each illustrate an embodiment of a low-density pattern element 34, 35 and 36, respectively.

A first low-density pattern element 34 as shown in FIG. 3A has a uniform density of about 33%, represented as a 33% grey value. Such a uniform density is hard to provide in practice. Therefore, in prior art, a low density pattern element is generated by providing a number of dots of light scattering structures 33, as shown in FIG. 3B as black dots forming a second pattern element 35. A total surface area of the scattering structures 33 is about 33% of a total surface area of the low-density pattern element 35. If a size of each scattering structure 33 is small enough, the human visual system will not be able to distinguish each individual scattering structure 33. As a result, a viewer will experience an uniform low-density pattern element.

The second low-density pattern element 35, however, may not appear as a straight line segment as the first pattern element 34 of FIG. 3A. Due to the positioning of the scattering structures 33, a frayed or jagged line may be experienced by a viewer, as also apparent when viewing the line segment 35 of FIG. 3B. In order to prevent such frayed or jagged appearance, in a third pattern element 36 as shown in FIG. 3C, a main surface area of the pattern element is formed by the light scattering structure. To reduce the density, a number of transparent areas are arranged within such main surface area. Referring to FIG. 3C in more detail, a black area 37 is formed by a light scattering surface or composition, while a number of white areas 38 are not light-scattering and are thus transparent. As a result, a boundary between the third pattern element 36 and its adjacent surrounding area S appears as a straight edge, similar to the straight edge of the first low-density pattern element 34 (FIG. 3A).

FIGS. 4A-4D illustrate a method of providing an illumination pattern on a transparent element 22. In a first step as illustrated in FIG. 4A, a transparent element 22 is provided. The transparent panel 22 maybe a rigid panel, like a glass pane or the like, that may be used as the exterior pane 21 or the interior pane of the transparent panel 2 (see FIG. 2). In another embodiment, the transparent element 22 maybe a flexible element, like a polymer foil or the like, that may be used as the polymer layer 23 (see FIG. 2).

Based on a designed illumination pattern comprising at least one low-density pattern element, an inverse pattern is designed. The inverse design pattern comprises the transparent areas (cf. white areas 38 and the surroundings S in FIG. 3C). Thus, as is apparent from FIG. 3C, such an inverse pattern is complementary to the designed illumination pattern. In a second step as illustrated in FIG. 4B, the inverse pattern is provided on a surface of the transparent element 22 by providing inverse pattern structures 40 on such surface. The inverse pattern structures 40 may be provided by any suitable method such that the provided inverse pattern may be later removed without leaving any residue or remaining parts. For example, a heat-meltable or a soluble composition may be used to provide the inverse pattern structures 40 by screen printing or inkjet printing.

In a third step as illustrated in FIG. 4C, the inverse pattern structures 40 are used as a mask. Where the surface of the transparent element 22 is not covered by inverse pattern structures 40, the surface is treated. For example, a light scattering composition may be applied in the voids between the inverse pattern structures 40 or a texture of the surface of the transparent element 22 maybe changed by blasting or etching or the like such to form the light-scattering structures 33 at the location of the voids between the inverse pattern structures 40.

Then, in a fourth step as illustrated in FIG. 4D, the inverse pattern structures 40 are removed, e.g. by application of heat to melt the composition of the inverse pattern structures 40 or by application of a solvent to dissolve the composition of the inverse pattern structures 40, as above described as exemplary embodiments.

The transparent element 22 resulting after the fourth step may be ready to be used as a closure member of a roof assembly. In another embodiment, the transparent element 22 may be treated further. For example, it may be combined with further transparent elements to form the multi-layered transparent panel 2 as shown in FIG. 2.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

Although the present disclosure has been described with reference to preferred embodiments, workers skilled in the art will recognize that changes may be made in form and detail without departing from the spirit and scope of the disclosure.

The invention claimed is:

1. A roof assembly for covering an opening in a vehicle roof, the roof assembly comprising:
   a transparent panel; and
   a lighting assembly comprising an illumination pattern arranged on the transparent panel,
      wherein the illumination pattern comprises at least one low-density pattern line element, the low-density pattern line element comprising a light-scattering area and enclosed transparent areas enclosed within the light-scattering area,
      wherein an edge of the low-density pattern line element is formed between the light-scattering area and a surrounding area, the surrounding area being adjacent to the low-density pattern line element,
      wherein the enclosed transparent areas each have a surface area with a representative diameter of 150 microns or less, and
      wherein a surface area of the light-scattering area of the low-density pattern line element is smaller than a sum of a surface area of the enclosed transparent areas.

2. The roof assembly according to claim 1, wherein the light-scattering area comprises a light-scattering composition.

3. The roof assembly according to claim 1, wherein the light-scattering area of the transparent panel comprises a surface texture different than the transparent areas.

4. The roof assembly according to claim 1, wherein the transparent panel comprises a glass pane, the glass pane comprising a first main surface and a second main surface opposite the first main surface and four edge surfaces extending between the first main surface and the second main surface, wherein a light source is arranged adjacent to one of the edge surfaces for injecting light into the glass pane in a direction substantially parallel to the first and the second main surface, and wherein the illumination pattern is provided on one of the first and the second main surface for scattering the injected light through one of the first and the second main surface.

5. The roof assembly according to claim 1, wherein the roof assembly is an open-roof assembly, the transparent panel being moveably arranged as a closure member of the open-roof assembly for covering or at least partly uncovering the opening in the vehicle roof.

6. A vehicle having a vehicle roof and comprising a roof assembly mounted in an opening of the vehicle roof, the roof assembly comprising:
   a transparent panel; and
   a lighting assembly comprising an illumination pattern arranged on the transparent panel,
      wherein the illumination pattern comprises at least one low-density pattern line element, the low-density pattern line element comprising a light-scattering area and enclosed transparent areas enclosed within the light-scattering area,
      wherein an edge of the low-density pattern line element is formed between the light-scattering area and a surrounding area, the surrounding area being adjacent to the low-density pattern line element,
      wherein the enclosed transparent areas each have a surface area with a representative diameter of 150 microns or less, and
      wherein a surface area of the light-scattering area of the low-density pattern line element is smaller than a sum of a surface area of the enclosed transparent areas.

7. The vehicle according to claim 6, wherein the light-scattering area comprises a light-scattering composition.

8. The vehicle according to claim 6, wherein the light-scattering area of the transparent panel comprises a surface texture different than the transparent areas.

9. The vehicle according to claim 6, wherein the transparent panel comprises a glass pane, the glass pane comprising a first main surface and a second main surface opposite the first main surface and four edge surfaces extending between the first main surface and the second main surface, wherein a light source is arranged adjacent to one of the edge surfaces for injecting light into the glass pane in a direction substantially parallel to the first and the second main surface, and wherein the illumination pattern is provided on one of the first and the second main surface for scattering the injected light through one of the first and the second main surface.

10. The vehicle according to claim 6, wherein the roof assembly is an open-roof assembly, the transparent panel being moveably arranged as a closure member of the open-roof assembly for covering or at least partly uncovering the opening in the vehicle roof.

* * * * *